United States Patent
Lee et al.

(10) Patent No.: US 9,400,698 B2
(45) Date of Patent: Jul. 26, 2016

(54) PORTABLE ELECTRONIC APPARATUS AND PORTABLE CLOUD COMPUTING SYSTEM

(71) Applicant: NATIONAL CHENG KUNG UNIVERSITY, Tainan (TW)

(72) Inventors: Chiang Lee, Tainan (TW); Chao-Hsien Hsieh, New Taipei (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 242 days.

(21) Appl. No.: 13/957,090

(22) Filed: Aug. 1, 2013

(65) Prior Publication Data
US 2014/0351319 A1 Nov. 27, 2014

(30) Foreign Application Priority Data
May 24, 2013 (TW) .............................. 102118513 A

(51) Int. Cl.
*G06F 15/173* (2006.01)
*G06F 9/50* (2006.01)
*H04W 4/00* (2009.01)
*H04L 29/08* (2006.01)

(52) U.S. Cl.
CPC .............. *G06F 9/5072* (2013.01); *H04L 67/10* (2013.01); *H04W 4/003* (2013.01); *H04W 4/008* (2013.01); *G06F 9/5077* (2013.01)

(58) Field of Classification Search
USPC ................ 709/226, 203; 715/810, 825; 714/3
See application file for complete search history.

(56) References Cited

U.S. PATENT DOCUMENTS

| | | | | |
|---|---|---|---|---|
| 2011/0138047 A1* | 6/2011 | Brown | .................. | G06F 9/5072 709/226 |
| 2013/0283298 A1* | 10/2013 | Ali | ......................... | G06F 9/5077 719/319 |
| 2014/0040656 A1* | 2/2014 | Ho | ......................... | G06F 9/5077 714/3 |

FOREIGN PATENT DOCUMENTS

TW         M451587 U1     4/2013

* cited by examiner

*Primary Examiner* — Kyung H Shin
(74) *Attorney, Agent, or Firm* — Muncy, Geissler, Olds & Lowe, P.C.

(57) ABSTRACT

A portable electronic apparatus includes an operating system comprising an application layer, an application framework layer, a libraries layer and a kernel layer. The application layer includes a cloud user interface allowing a user to perform an interactive function. The application framework layer includes a plurality of cloud components and at least a cloud service. The libraries layer includes a plurality of cloud managers. The kernel layer includes a cloud server driver, which is connected to the cloud managers to start the cloud service, so that the cloud service calls one of the cloud components according to the interactive function. By such configuration, the portable electronic apparatus of this invention can carry a private cloud to provide the service of a portable personal cloud.

14 Claims, 3 Drawing Sheets

PORTABLE ELECTRONIC APPARATUS AND PORTABLE CLOUD COMPUTING SYSTEM

CROSS REFERENCE TO RELATED APPLICATIONS

This Non-provisional application claims priority under 35 U.S.C. §119(a) on Patent Application No(s). 102118513 filed in Taiwan, Republic of China on May 24, 2013, the entire contents of which are hereby incorporated by reference.

BACKGROUND OF THE INVENTION

1. Field of Invention

The invention relates to an electronic apparatus and a computing system and, in particular, to a portable electronic apparatus and a portable cloud computing system.

2. Related Art

Cloud computing is with regard to a computing architecture based on the Internet, through which the shared resources of hardware and software and the information can be provided for the remote computers or other kinds of apparatuses in need.

Generally, when a portable electronic apparatus or personal computer is connected to a cloud server, the cloud owning the cloud server can provide a lot of service for them. In other words, a large amount of computation and storage are performed on the cloud, even including the record of commercial activities. Accordingly, the cloud can provide the services of infrastructure, platform and software for the remote users, and thereby the cost of hardware and development on the user end is reduced a lot.

However, there are some phenomena worthy to be noted nowadays. Much data transmission started by the application softwares are performed just between the portable electronic apparatuses or through a personal webpage, not involved with a too-big-to-be-portable cloud. On the other hand, although the processing efficiency of the portable electronic apparatus becomes more and more powerful, it still can not provide the cloud service.

Therefore, it is an important subject to provide a portable electronic apparatus and a portable cloud computing system so that the level and efficiency thereof can be upgraded and the application field thereof can be enlarged.

SUMMARY OF THE INVENTION

In view of the foregoing subject, an objective of the invention is to provide a portable electronic apparatus and a portable cloud computing system so that the level and efficiency thereof can be upgraded and the application field thereof can be enlarged.

To achieve the above objective, a portable electronic apparatus according to the invention includes an operating system comprising an application layer, an application framework layer, a libraries layer and a kernel layer. The application layer includes a cloud user interface allowing a user to perform an interactive function. The application framework layer includes a plurality of cloud components and at least a cloud service. The libraries layer includes a plurality of cloud managers. The kernel layer includes a cloud server driver, which is connected to the cloud managers to start the cloud service, so that the cloud service calls one of the cloud components according to the interactive function.

In one embodiment, the interactive function includes register, query, deletion, updating, or insertion.

In one embodiment, the application layer further includes a cloud machine interface, which is a machine-to-machine interactive interface.

In one embodiment, the cloud components include at least two of availability, grid computing, virtualization, provisos and security.

In one embodiment, the cloud service includes a plurality of programs, which include at least two of team collaboration, web service integration and marshalling, database integration, security, scalability, storage, persistence, state management, application versioning, and application instrumentation and developer community facilitation.

In one embodiment, the cloud managers include a cloud computing manager, a cloud network manager and a cloud storage manager, the cloud computing manager defines and adjusts the using condition variables of a central processing unit (CPU) of the portable electronic apparatus, the cloud network manager defines and adjusts the using condition variables of the network, and the cloud storage manager defines and adjusts the using condition variables of the storage.

In one embodiment, the cloud server driver further turns on or off a bottom-layer communication control of the portable electronic apparatus.

In one embodiment, the operating system architecture is divided into a software as a Service (SaaS), a platform as a Service (PaaS) and an infrastructure as a Service (IaaS), the SaaS covers the application layer, the PaaS covers the application framework layer, and the IaaS covers the libraries layer and kernel layer.

In one embodiment, the portable electronic apparatus is a cell phone, a tablet computer or a notebook computer.

To achieve the above objective, a portable cloud computing system according to the invention comprises any of the above-mentioned portable electronic apparatuses and at least a remote apparatus. The remote apparatus is connected to the portable electronic apparatus through a network and transmits data to the portable electronic apparatus through the cloud user interface.

In one embodiment, the remote apparatus is a sensor, cell phone, tablet computer, notebook computer or desktop computer.

In one embodiment, the portable cloud computing system further comprises a storage apparatus, which is externally connected to the portable electronic apparatus and includes a codec file for implementing a security validation of the portable electronic apparatus.

In one embodiment, the portable cloud computing system further comprises a cloud, which includes a cloud server. The data transmission is performed between the cloud server and the portable electronic apparatus.

As mentioned above, after the proper configuration, the portable electronic apparatus according to the invention becomes capable of carrying a private or personal cloud, providing users with services of a personal cloud, such as a software as a Service (SaaS), a platform as a Service (PaaS) and an infrastructure as a Service (IaaS). Thereby, the level and efficiency of the portable electronic apparatus can be enhanced, and the application field thereof can be enlarged. Besides, the portable electronic apparatus of this invention can be connected to at least one remote apparatus to constitute a portable cloud computing system, which can be applied to the biomedical, community or commercial field for example. For instance, the portable electronic apparatus and portable cloud computing system of the invention can be applied to a medical knowledge trading community, learning experience trading community, video trading community, stock knowledge trading community, etc. with the same principle where an expert in a certain field run a business by sharing or teaching through the portable electronic apparatus. In other words, the expert's experience is traded to the users in need in a commercial way through the personal cloud.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
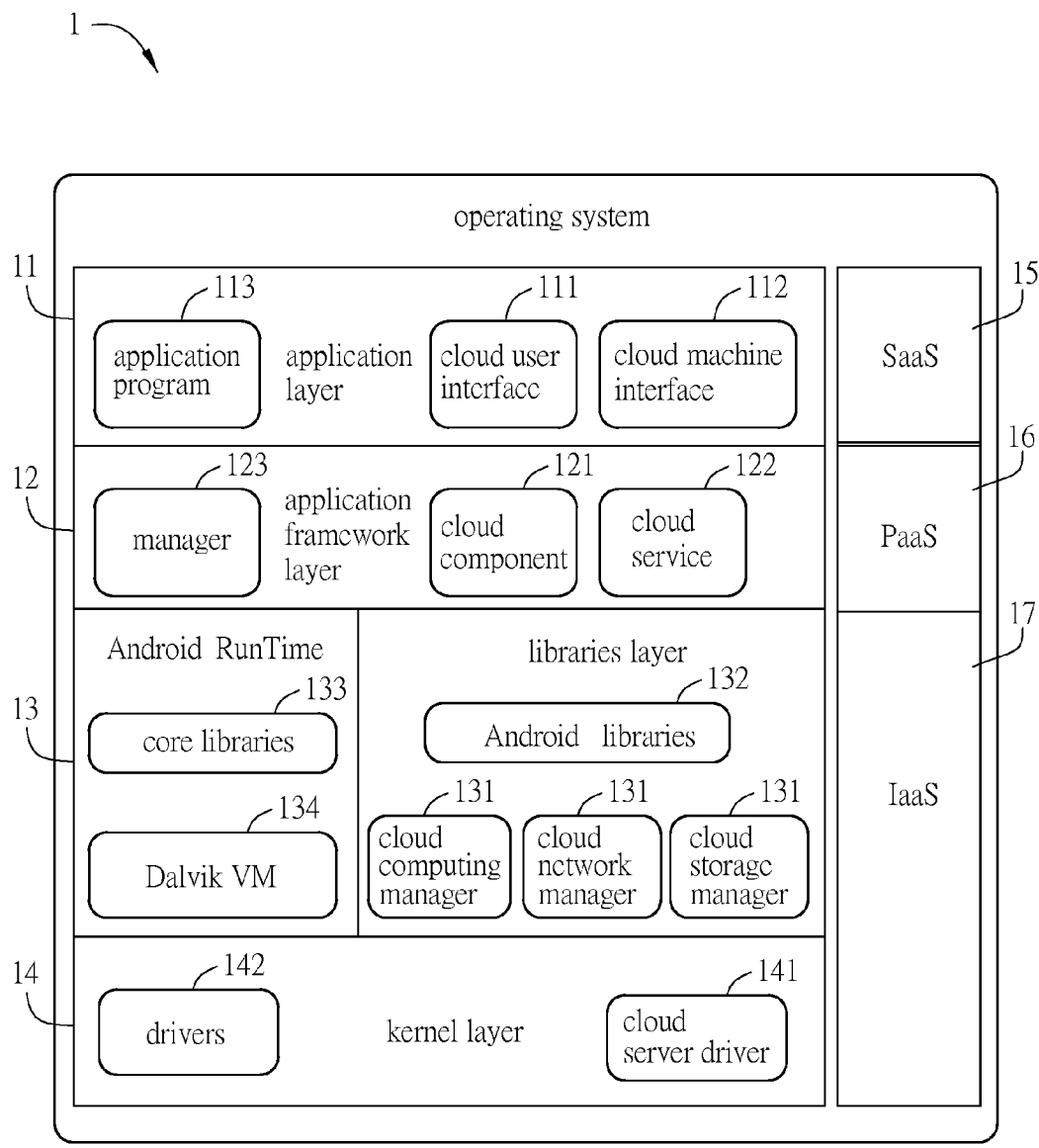
FIG. 1 is a schematic block diagram of a portable electronic apparatus according to a preferred embodiment of the invention.

FIG. 1 is a schematic block diagram of a portable electronic apparatus 1 according to a preferred embodiment of the invention. The portable electronic apparatus 1 of the invention is not limited in type as long as it is capable of computing. The portable electronic apparatus 1 is such as a cell phone, a tablet computer or a notebook computer.

The portable electronic apparatus 1 includes an operating system (OS), such as a Windows or Android OS. The operating system of this embodiment is an Android OS for example. As shown in FIG. 1, the operating system of the portable electronic apparatus 1 includes an application layer 11, an application framework layer 12, a libraries layer 13 and a kernel layer 14.

The application layer 11 includes a cloud user interface 111, which makes a user to perform an interactive function, such as register, query, deletion, updating, or insertion. The application layer 11 can further include a cloud machine interface 112, which is a machine-to-machine interactive interface. The automatic identification can be performed by the cloud machine interface 112, and thus the outside data can be transmitted to the inside or the inside data can be transmitted to the outside. Besides, the application layer 11 can further include a plurality of application programs 113, which can be the original ones of the Android system and can provide many different software services, such as data processing or image processing, for users.

The application framework layer 12 includes a plurality of cloud components 121 and at least a cloud service 122 (multiple cloud services given as an example here). The cloud components 121 include, for example, at least two of availability, grid computing, virtualization, provisos and security. The availability can allow an inside cloud or outside cloud to access the data. The grid computing can automatically distribute the tasks to achieve the efficiency optimization. The virtualization can be compatible with the virtualization solutions. The provisos can perform the identification by layers according to the identification levels and establish or delete a service or application, and also can add or delete a configuration. The security can satisfy the things as follows: (a) the person owning the data, (b) the manager, (c) sensitive data to be processed (such as a credit card, identification number and medical number), (d) examination of the personal information protection Act, and (e) ensuring having the logs of the above-mentioned items for the demanded check. The cloud service 122 can provide users with an operating system platform and an application system developing platform so that the developer of the application system can directly compose the program on these platforms and serve for the outside. The cloud service 122 includes a plurality of programs, which include, for example but are not limited to, at least two of team collaboration, web service integration and marshalling, database integration, security, scalability, storage, persistence, state management, application versioning, and application instrumentation and developer community facilitation. These items belong to the characters of the cloud computing, and therefore they are not described here for conciseness. Besides, the application framework layer 12 can further include a manager 123, which can be an original manager of the Android system.

The libraries layer 13 includes a plurality of cloud managers 131, which include a cloud computing manager, a cloud network manager and a cloud storage manager. The cloud computing manager defines and adjusts the using condition variables of a central processing unit (CPU) of the portable electronic apparatus 1. The cloud network manager defines and adjusts the using condition variables of the network. The cloud storage manager defines and adjusts the using condition variables of the storage. Besides, the libraries layer 13 can further include an Android libraries 132, and a core libraries 133 and Dalvik VM (virtual machine) 134 in an Android OS environment.

The kernel layer 14 includes a cloud server driver 141, which connects to the cloud managers 131 to start the cloud service 122, and therefore the cloud service 122 can call one of the cloud components 121 according to the interactive function. The cloud server driver 141 can further turn on or off a bottom-layer communication control of the portable electronic apparatus. Besides, the kernel layer 14 can further include other drivers 142, such as the original drivers of the Android system.

Concerning the cloud computing, the operating system architecture shown in FIG. 1 is divided into a software as a Service (SaaS) 15, a platform as a Service (PaaS) 16 and an infrastructure as a Service (IaaS) 17. The SaaS covers the application layer 11, the PaaS covers the application framework layer 12, and the IaaS covers the libraries layer 13 and kernel layer 14. By the configuration as shown in FIG. 1, the portable electronic apparatus 1 of the invention can provide a cloud service to serve as a portable cloud electronic apparatus, and can be connected to other remote apparatuses to constitute a portable cloud computing system to provide them with the cloud service.

Figure 2:
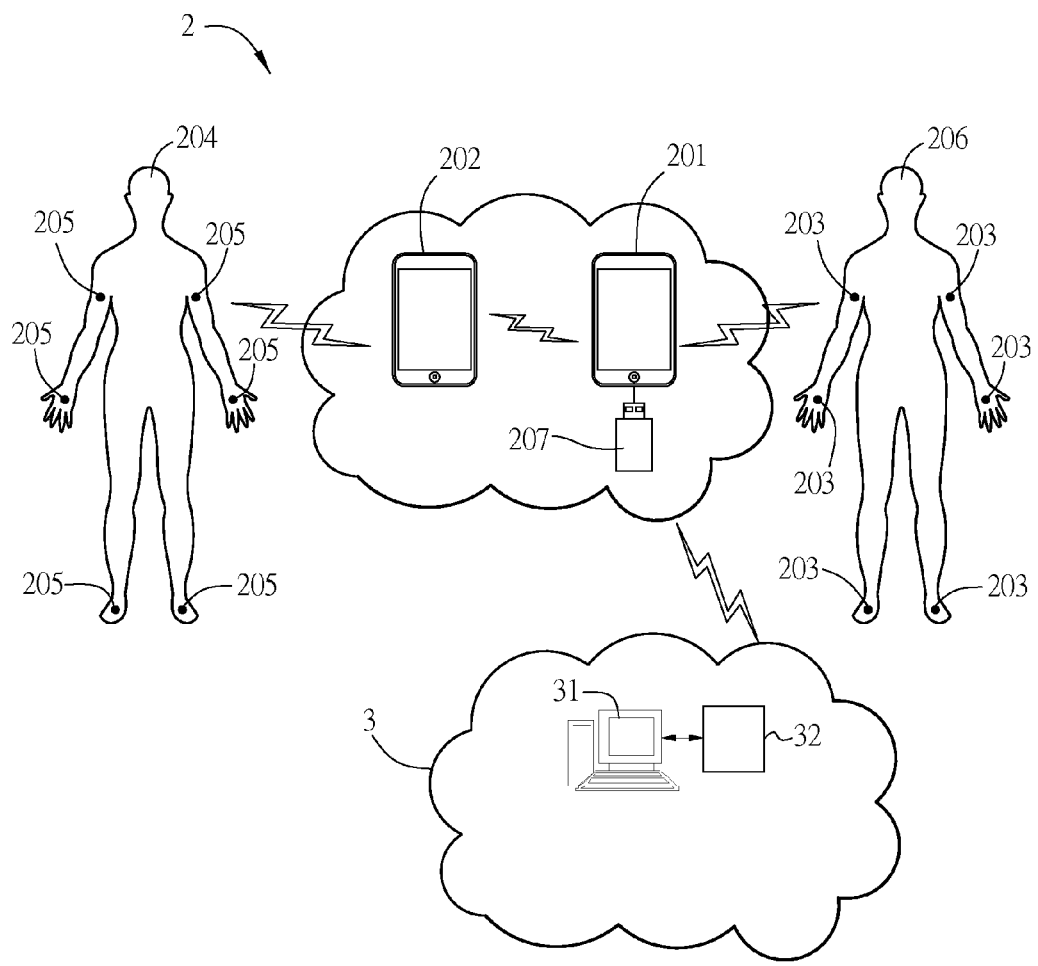
FIG. 2 is a schematic diagram of a portable cloud computing system according to a preferred embodiment of the invention.

FIG. 2 is a schematic diagram of a portable cloud computing system 2 according to a preferred embodiment of the invention. As shown in FIG. 2, the portable cloud computing system 2 includes a portable electronic apparatus 201 and remote apparatuses 202 and 203. The portable electronic apparatus 201 is such as the above-mentioned portable electronic apparatus 1. The remote apparatuses 202 and 203 are connected to the portable electronic apparatus 201 through a network, and can transmit data to the portable electronic apparatus 201 through the cloud user interface 111. The portable cloud computing system 2 is applied to the biomedical field for example.

The remote apparatus of the invention is, for example but not limited to, a sensor, cell phone, tablet computer, notebook computer or desktop computer. Herein, the remote apparatus 202 is a cell phone and belongs to a user 204 wearing a plurality of sensors 205. The sensors 205 can sense physiological signals of the user 204 and transmits the physiological signals to the remote apparatus 202, and then the remote apparatus 202 transmits the signals to the portable electronic apparatus 201. The user owning the portable electronic apparatus 201 can analyze these signals and thus give some advice to the user 204. Or, the user of the portable electronic apparatus 201 can legally and properly treat these signals to help the user 204. Another user 206 wears a plurality of remote apparatuses 203, which are sensors for example, and is not far from the portable electronic apparatus 201. In this case, the remote apparatuses 203 can directly transmit the physiological signals of the user 206 to the portable electronic apparatus 201 for the signal processing. Furthermore, the portable electronic apparatus 201 can be connected to a medical cloud 3 so that the received information can be treated better through the medical cloud 3. The portable electronic apparatus 201 also can be connected to other kinds of clouds, such as a personal cloud, private cloud or public cloud, and can be connected to the clouds with different properties, such as a medical cloud, commercial cloud or community cloud.

In this embodiment, the remote apparatus may unceasingly transmit the information to the portable electronic apparatus 201. For limiting the amount of the transmitted information, the remote apparatus can be configured with a screening mechanism, such as a skyline screening mechanism, which sets a threshold value or line for the information to decrease the amount of the transmitted information. Thereby, the portable electronic apparatus 201 and the portable cloud computing system 2 can be enhanced in efficiency.

Figure 3:
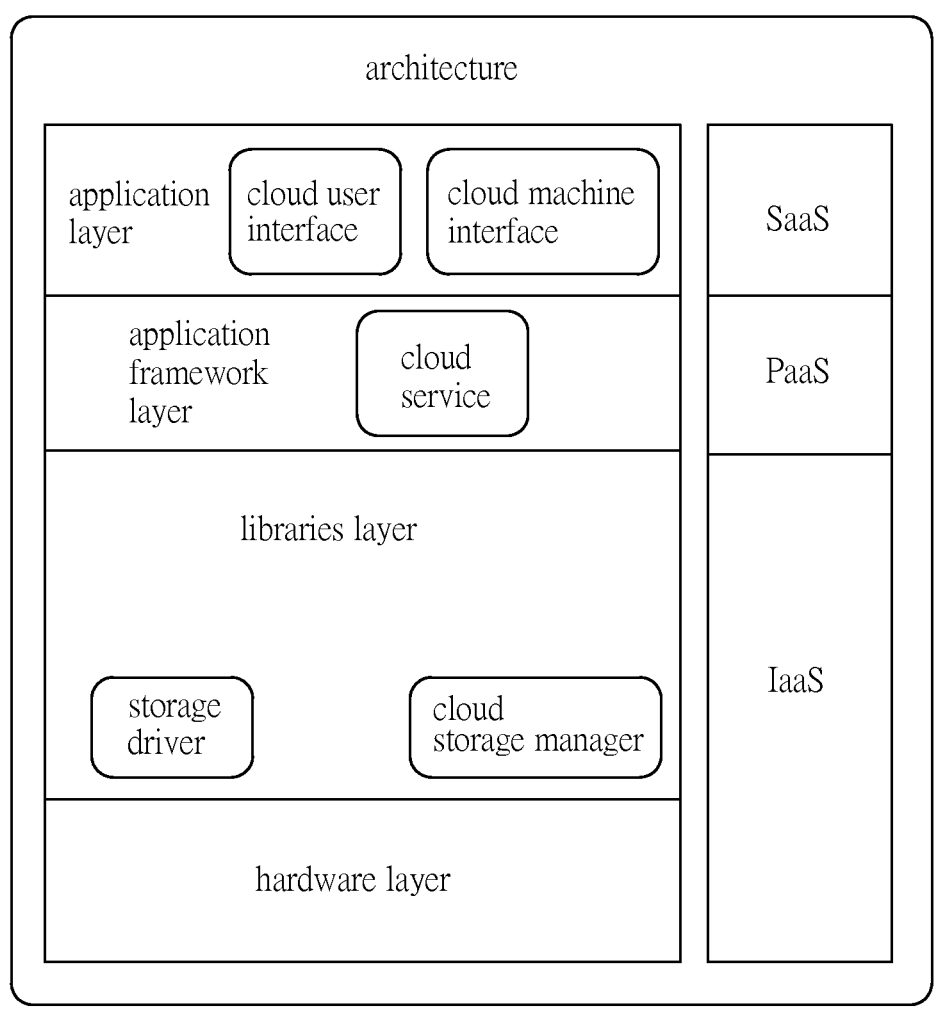
FIG. 3 is a schematic diagram of the architecture of a storage apparatus according to an embodiment of the invention.

The portable cloud computing system 2 can further include a storage apparatus 207, which is externally connected to the portable electronic apparatus 201. The storage apparatus 207 can extend the storage capacity of the portable electronic apparatus 201, and is incorporated into the personal cloud of the portable electronic apparatus 201. The storage apparatus 207 can include a codec file for implementing the security validation of the portable electronic apparatus 201. The codec file includes an encryption/decryption mechanism, and can be realized by at least an algorithm. FIG. 3 is a schematic diagram of the architecture of the storage apparatus 207 according to an embodiment of the invention. In this embodiment, the architecture of the storage apparatus 207 is designed as corresponding to that of the portable electronic apparatus 201 for increasing the mutual compatibility. Since the architecture of the storage apparatus 207 can be comprehended by referring to that of the portable electronic apparatus 201, it is not described here for conciseness.

To be noted, as shown in FIG. 2, a medical cloud 3 also can be incorporated in the portable cloud computing system 2 of the embodiment. The medical cloud can include a cloud server 31 and a codec file 32. The data transmission can be performed between the cloud server 31 and the portable electronic apparatus 201. The codec file 32 can implement the security validation of the portable electronic apparatus 201. The codec file 32 can include an encryption/decryption mechanism, and can be realized by at least an algorithm. The codec file 32 can be realized by at least one of software, hardware and firmware.

In summary, after the proper configuration, the portable electronic apparatus according to the invention becomes capable of carrying a private or personal cloud, providing users with services of a personal cloud, such as a software as a Service (SaaS), a platform as a Service (PaaS) and an infrastructure as a Service (IaaS). Thereby, the level and efficiency of the portable electronic apparatus can be enhanced, and the application field thereof can be enlarged. Besides, the portable electronic apparatus of this invention can be connected to at least one remote apparatus to constitute a portable cloud computing system, which can be applied to the biomedical, community or commercial field for example. For instance, the portable electronic apparatus and portable cloud computing system of the invention can be applied to a medical knowledge trading community, learning experience trading community, video trading community, stock knowledge trading community, etc. with the same principle where an expert in a certain field run a business by sharing or teaching through the portable electronic apparatus. In other words, the expert's experience is traded to the users in need in a commercial way through the personal cloud.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A portable electronic apparatus including an operating system comprising:
   an application layer including a cloud user interface allowing a user to perform an interactive function;
   an application framework layer including a plurality of cloud components and at least a cloud service;
   a libraries layer including a plurality of cloud managers; and
   a kernel layer including a cloud server driver, which is connected to the cloud managers to start the cloud service, so that the cloud service calls one of the cloud components according to the interactive function,
   wherein the libraries layer further comprises an Android libraries, and a core libraries and Dalvik virtual machine,
   wherein the application layer further includes a cloud machine interface, which is a machine-to-machine interactive interface,
   wherein the cloud managers include a cloud computing manager, a cloud network manager and a cloud storage manager, the cloud computing manager defines and adjusts the using condition variables of a central processing unit (CPU) of the portable electronic apparatus, the cloud network manager defines and adjusts the using condition variables of the network, and the cloud storage manager defines and adjusts the using condition variables of the storage,
   wherein the portable electronic apparatus is a cell phone, a tablet computer or a notebook computer.

2. The portable electronic apparatus as recited in claim 1, wherein the interactive function includes register, query, deletion, updating, or insertion.

3. The portable electronic apparatus as recited in claim 1, wherein the cloud components include at least two of availability, grid computing, virtualization, provisos and security.

4. The portable electronic apparatus as recited in claim 1, wherein the cloud service includes a plurality of programs, which include at least two of team collaboration, web service integration and marshalling, database integration, security, scalability, storage, persistence, state management, application versioning, and application instrumentation and developer community facilitation.

5. The portable electronic apparatus as recited in claim 1, wherein the cloud server driver further turns on or off a bottom-layer communication control of the portable electronic apparatus.

6. The portable electronic apparatus as recited in claim 1, wherein the operating system architecture is divided into a software as a Service (SaaS), a platform as a Service (PaaS) and an infrastructure as a Service (IaaS), the SaaS covers the application layer, the PaaS covers the application framework layer, and the IaaS covers the libraries layer and kernel layer.

7. A portable cloud computing system, comprising:
a portable electronic apparatus as recited in claim 1; and
at least a remote apparatus connected to the portable electronic apparatus through a network and transmitting data to the portable electronic apparatus through the cloud user interface,
wherein the remote apparatus is a cell phone, a tablet computer, a notebook computer or a desktop computer.

8. The portable cloud computing system as recited in claim 7, wherein the interactive function includes register, query, deletion, updating, or insertion.

9. The portable cloud computing system as recited in claim 7, wherein the cloud components include at least two of availability, grid computing, virtualization, provisos and security.

10. The portable cloud computing system as recited in claim 7, wherein the cloud service includes a plurality of programs, which include at least two of team collaboration, web service integration and marshalling, database integration, security, scalability, storage, persistence, state management, application versioning, and application instrumentation and developer community facilitation.

11. The portable cloud computing system as recited in claim 7, wherein the cloud server driver further turns on or off a bottom-layer communication control of the portable electronic apparatus.

12. The portable cloud computing system as recited in claim 7, wherein the operating system architecture is divided into a software as a Service (SaaS), a platform as a Service (PaaS) and an infrastructure as a Service (IaaS), the SaaS covers the application layer, the PaaS covers the application framework layer, and the IaaS covers the libraries layer and kernel layer.

13. The portable cloud computing system as recited in claim 7, further comprising:
a storage apparatus externally connected to the portable electronic apparatus and including a codec file for implementing a security validation of the portable electronic apparatus.

14. The portable cloud computing system as recited in claim 7, further comprising:
a cloud including a cloud server, wherein the data transmission is performed between the cloud server and the portable electronic apparatus.

* * * * *